United States Patent
Kenington

(10) Patent No.: US 8,971,827 B2
(45) Date of Patent: Mar. 3, 2015

(54) MODULE FOR AN ACTIVE ANTENNA SYSTEM

(71) Applicant: Peter Kenington, Chepstow (GB)

(72) Inventor: Peter Kenington, Chepstow (GB)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 13/927,689

(22) Filed: Jun. 26, 2013

(65) Prior Publication Data

US 2013/0287073 A1    Oct. 31, 2013

Related U.S. Application Data

(63) Continuation of application No. 12/952,294, filed on Nov. 23, 2010, now abandoned.

(51) Int. Cl.
   H04B 1/44   (2006.01)
   H04B 1/40   (2006.01)
   H01Q 1/12   (2006.01)
   H01Q 1/24   (2006.01)

(52) U.S. Cl.
   CPC .............. *H04B 1/40* (2013.01); *H01Q 1/1242* (2013.01); *H01Q 1/246* (2013.01)
   USPC ................. 455/83; 455/78; 455/90; 375/219; 375/220

(58) Field of Classification Search
   CPC ........................................................ H04B 1/44
   USPC ............. 455/78, 83, 90.3, 550.1, 551, 556.1, 455/557, 562.1, 575.1, 575.5; 375/219, 220
   See application file for complete search history.

(56) References Cited

U.S. PATENT DOCUMENTS

| | | |
|---|---|---|
| 4,852,094 A | 7/1989 | Wang |
| 5,615,034 A * | 3/1997 | Hori .............................. 398/158 |
| 5,642,405 A | 6/1997 | Fischer et al. |
| 5,657,374 A | 8/1997 | Russell et al. |
| 5,812,522 A | 9/1998 | Lee et al. |
| 5,818,883 A | 10/1998 | Smith et al. |
| 5,909,471 A | 6/1999 | Yun |
| 6,160,506 A | 12/2000 | Pellon |

(Continued)

FOREIGN PATENT DOCUMENTS

| | | |
|---|---|---|
| EP | 924864 | 6/1999 |
| EP | 1143554 | 10/2001 |

(Continued)

OTHER PUBLICATIONS

Official Action for JP 2009-519864 issued on Jan. 24, 2012.

*Primary Examiner* — Tuan H Nguyen
(74) *Attorney, Agent, or Firm* — Stephen H. Eland; Dann, Dorfman, Herrell & Skillman

(57) ABSTRACT

A module for an active antenna system for receiving and transmitting radio signals sealed in a housing. It comprises a power connector placed at the outside of the housing for supplying the module with supply power; at least one micro radio for receiving/sending digital radio signals having a digital down-converter/a digital up-converter and a control signal converter. The micro radio converts the digital radio signals to analog RF (radio frequency) signals and vice versa and is connected to the internal bus. At least one antenna element is connected to the micro radio and an internal data bus for the exchange of digital radio data and control data is connected to micro radio and hub. By placing two or more modules next to each other on a frame these modules form an active antenna system.

15 Claims, 6 Drawing Sheets

(56) References Cited

U.S. PATENT DOCUMENTS

| | | | |
|---|---|---|---|
| 6,167,099 A | 12/2000 | Rader et al. | |
| 6,219,347 B1 | 4/2001 | Uchida et al. | |
| 6,243,430 B1 | 6/2001 | Mathe | |
| 6,349,217 B1 | 2/2002 | Honcharenko et al. | |
| 6,463,295 B1 | 10/2002 | Yun | |
| 6,518,904 B1 | 2/2003 | Jelonnek | |
| 6,594,773 B1 | 7/2003 | Lisitsa et al. | |
| 6,744,832 B2 | 6/2004 | Miao | |
| 6,785,558 B1 | 8/2004 | Stratford et al. | |
| 6,801,788 B1 * | 10/2004 | Csapo et al. | 455/561 |
| 6,854,015 B2 | 2/2005 | McCormack et al. | |
| 7,328,033 B2 * | 2/2008 | Rappaport et al. | 455/500 |
| 7,405,685 B2 | 7/2008 | Rezeq et al. | |
| 7,474,712 B1 | 1/2009 | Keating | |
| 7,480,689 B2 | 1/2009 | Song | |
| 2002/0147978 A1 | 10/2002 | Dolgonos et al. | |
| 2004/0142728 A1 | 7/2004 | Tari et al. | |
| 2004/0198451 A1 | 10/2004 | Varghese | |
| 2004/0219950 A1 * | 11/2004 | Pallonen et al. | 455/562.1 |
| 2005/0113120 A1 | 5/2005 | Rappaport et al. | |
| 2007/0057845 A1 | 3/2007 | Miura | |
| 2009/0252205 A1 | 10/2009 | Rheinfelder et al. | |

FOREIGN PATENT DOCUMENTS

| | | |
|---|---|---|
| GB | 611096 | 10/1948 |
| GB | 2354674 | 3/2001 |
| GB | 2393580 | 3/2004 |
| JP | 10-502513 | 3/1998 |
| JP | 2000041277 | 2/2000 |
| JP | 2000068839 | 3/2000 |
| JP | 2001512953 | 8/2001 |
| JP | 2001515691 | 9/2001 |
| JP | 2001358744 | 12/2001 |
| JP | 2002501319 | 1/2002 |
| JP | 2004523942 | 8/2004 |
| JP | 2005136880 | 5/2005 |
| WO | 96/29834 | 9/1996 |
| WO | 99/37047 | 7/1999 |
| WO | 02/47411 | 6/2002 |
| WO | 2005/120001 | 12/2005 |
| WO | 2008/009421 | 1/2008 |

* cited by examiner

MODULE FOR AN ACTIVE ANTENNA SYSTEM

CROSS REFERENCE TO RELATED APPLICATION

This application is a continuation application of U.S. patent application Ser. No. 12/952,294 filed on Nov. 23, 2010. This application is also related to U.S. patent application Ser. No 12/339,239 "Antenna Array System" filed on Jul. 17, 2007. The entire contents of each of the foregoing applications are incorporated herein by reference.

FIELD OF THE INVENTION

This field of the present application relates in general to a module for an active antenna system and, in particular, for a module of an active antenna system used in a mobile communication system. The field of the application also relates to a method of manufacturing a module for an active antenna array as well as an active antenna array.

BACKGROUND OF THE INVENTION

The use of mobile communications networks has increased over the last decade. Operators of these mobile communications networks have increased the number of base transceiver stations in order to meet an increased demand for service by users of the mobile communications networks. The operators of the mobile communications network wish to purchase components for the base transceiver stations at a lower price and also wish to reduce the running costs of the base station. Active antenna systems have proven to meet these goals.

The term "base transceiver station (BTS)" in the context of this disclosure includes, but is not limited to, base stations, as known from GSM networks, as well as a node B (known from UMTS/3G networks) or enhanced node B, and similar units used in other mobile communication network.

The term "subscriber device" in the context of this disclosure is intended to encompass all types of mobile stations and other devices connected to the mobile communication network. Such subscriber devices can be portable or stationary. For example wireless modules can be incorporated into vending machines for the transceiving of data over the mobile communication network. Such wireless modules are also considered to be subscriber devices.

An active antenna system is known, for example, from the Applicant's co-pending international application PCT/EP2007/006334 and U.S. patent application Ser. No. 12/339,239, which is published as US Patent Application Publication No. US 2009/0252205. In the known active antenna system, the antenna is formed by a plurality of antenna elements. At least one of the antenna elements is directly connected to a dedicated radio unit. However, two or more of the antenna elements may be coupled to a single radio unit, for example by a Wilkinson coupler. As the digital radio unit is formed by a plurality of the radio units which are placed close to the antenna elements no coaxial cable is required in order to couple the digital radio unit to the antenna elements, especially if the radio units are arranged on the same printed circuit board or even monolithically integrated by microelectronic means or as a multi-chip module.

The radio units comprise at least one filter to separate downlink signals and uplink signals, e.g. transmit signals and receive signals. A receive signal is converted into a digital band-pass signal by a low-noise analogue-to-digital converter. The digital band-pass signal is down-converted into a digital base-band signal by a digital down converter, which is integrated in a digital transceiver. In order to generate the transmit signal a digital base-band signal is up-converted by a digital up-converter and transferred by a digital-analogue converter into a RF signal. Each one of the radio units is connected via a so-called C-Hub through an optical fibre to a base station. The C-hub converts the transmit signals and receive baseband signals into optical signals for transmission along the optical fibre according to a CPRI or OBSAI (or similar) standard interface. These optical signals are then transferred via the optical fibre to a digital radio server located at the base station. The optical fibre thereby may be up to 40 km long, enabling the remote location of the base station with respect to the antenna elements mounted on a tower-top.

The radio units, the C-hub and the antenna elements are arranged in one common housing. The common housing is usually mounted on the tower top of an antenna mast and is therefore part of the so-called tower-top equipment. Typically the active antenna system may comprise sixteen antenna elements, but this number is not limiting. The active antenna system with sixteen antenna elements may weigh up to 40 kg.

As the active antenna system contains active circuit elements, the risk of failure is higher than for purely passive antennas. The mobile communications network operators are generally hostile to the idea of having to replace the entire active antenna system in the event of a failure, even if the mobile communications operators can schedule and/or delay this replacement until a number of the modules have failed. The expense and time involved in a crane-based replacement of the active antenna system at a cell site may be a disincentive to the adoption of active antenna systems.

SUMMARY OF THE INVENTION

It is an aspect of the teachings of this disclosure to provide a module for an active antenna system to enable a splitting of an active antenna arrangement into at least two separate modules. Each one of the separate modules is substantially sealed in a weather-proof housing. Each one of the separate modules may also comprise a power connector placed at the outside of the housing for supplying the module with supply power. It is, possible, to supply the module with supply power by other means. The active antenna system further comprises at least one radio unit for transceiving digital radio signals having a digital down-converter/a digital up-converter and a control signal converter. The at least one radio unit converts the digital radio signals to analogue RF (radio frequency) signals and vice versa. The at least one radio unit is connected to the internal bus and at least one antenna element connected to the at least one radio unit. The module further comprises an internal data bus for collection and distribution of digital radio data and control data with the at least one radio unit as well at least one contactless communications interface.

In one aspect of the invention, the module also includes a hub that controls the collection and distribution of the digital radio data and control data. The hub may be switchable on and off so that in some implementations of the invention a single central hub controls the collection and distribution of the digital radio data and control data in different ones of the modules. In another implementation of the invention, each one of the modules has its own hub for controlling the collection and distribution of the digital radio data and control data in its own module as well as between the modules.

Each one of the modules weighs less than the active antenna arrangement in total and so each module is easier to handle by service personnel. If each one of the modules weighs less than 15 kg, the majority, if not all of, health and safety requirements world-wide for single-man lift/deployment operations at height are met. The service personnel can exchange single modules or all of the modules one by one on an antenna mast, without the need of a crane. This is in contrast to the active antenna system of the prior art that is contained in a single housing. The single housing of the prior art is so heavy that a crane has to be used to exchange the active antenna system as a whole.

Another aspect of the teachings of this application is that the module comprises at least one contactless communication interface for data collection and distribution between two or more adjacent modules. The contactless data exchange between the modules removes the need for plugs and sockets between adjacent ones of the modules. These plugs and sockets, in the field, might be a source of contact problems due to their exposure to weather and hence of unreliability for the active antenna system as a whole. It is less time-consuming for the service personnel to exchange the module, as the service technician does not have to carefully align and weather-proof seal the plugs and sockets to connect the adjacent modules. This reduces another source of error as well as reducing the time for the exchange of the module.

Another aspect of the teaching of this application is that the module is equipped on the outside of the housing with mounting parts which are formed such that when the module is slid into a frame the supply voltage connector is engaged with a counterpart supply voltage connector of the frame. As each of the modules is equipped with a power supply connector that engages with the power supply connector of the frame the module is mounted to, there is no need to connect one module with another module for the purpose of distributing a power supply. In this case the power supply is distributed over the frame to each one of the modules and the adjacent modules do not need to be connected directly to each other.

Another aspect of the teaching of this application is that the at least one radio unit, the internal bus, and the at least one interface are integrated on a single circuit board.

Another aspect of the teaching of this application is a method for manufacturing the module of an active antenna system.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
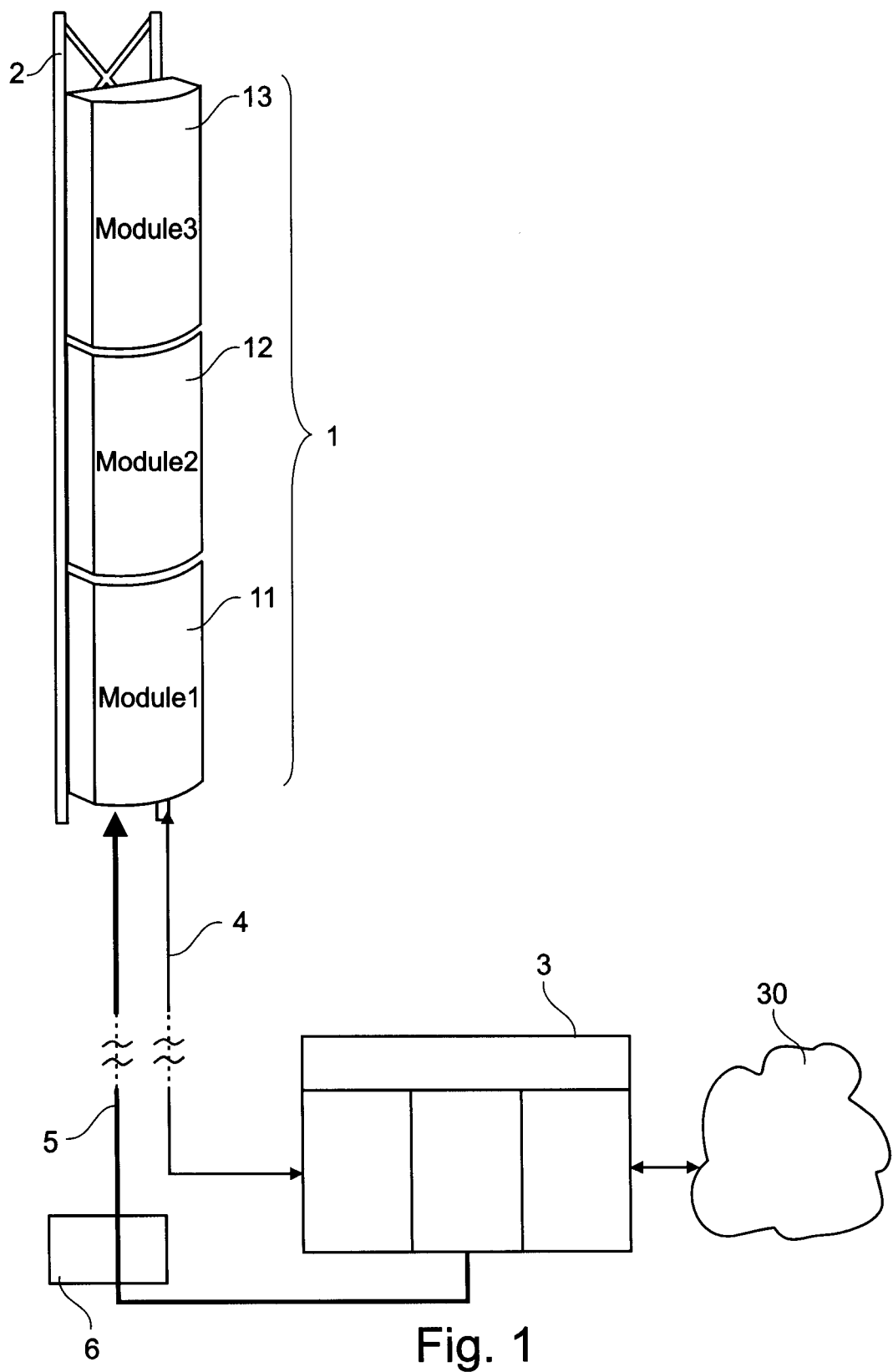
FIG. 1 shows a first aspect of the module according to the present disclosure.

FIG. 1 shows a first aspect of the module according to the present disclosure. An active antenna system 1 comprises a first module 11, a second module 12, and a third module 13 attached to an antenna mast 2. In this aspect of the present disclosure the three modules (the first module 11, second module 12 and the third module 13) commonly form the active antenna system 1. The person skilled in the art will appreciate that the active antenna system 1 may be arranged only with two modules or even by four or more modules. The person skilled in the art will strive to split the active antenna system 1 into the fewest possible number of modules. At the time of the present disclosure the active antenna system 1 with sixteen antenna elements was implemented and its weight was under 40 kg. The active antenna system 1 according to the present disclosure is designed to fit into the three modules 11, 12 and 13. The weight of each one of the three modules 11, 12 and 13 is envisioned to not exceed 15 kg; that is the weight that most health and safety requirements accept for deployment/lift of equipment at height by a single person. It will be appreciated that the modularisation of the active antenna system 1, as described in this disclosure, does add slightly to the overall weight of the active antenna system 1, however this disadvantage is outweighed by the previously mentioned advantages.

In the active antenna system 1 payload signals and control signals are sent and received from a base station equipment rack 3 in digital form. The payload signals and the control signals can be exchanged via a fibre optic cable 4 up to 40 km in length. The base station equipment rack 3 can be located in a remote place. Only a power supply cable 5 has to supply the active antenna system 1 with power from a power supply unit 6 located proximally. In the event that the base station equipment rack 3 is also very close to the active antenna system 1, the power supply unit 6 may also be incorporated in the base station equipment rack 6. The active antenna system 1 and the base station equipment rack 3 together form a traditional base transceiver station. The active antenna system 1 and the base station equipment rack 3 may together form a logical unit but the active antenna system 1 and the base station equipment rack 3 may be located physically apart from one another.

Figure 2:
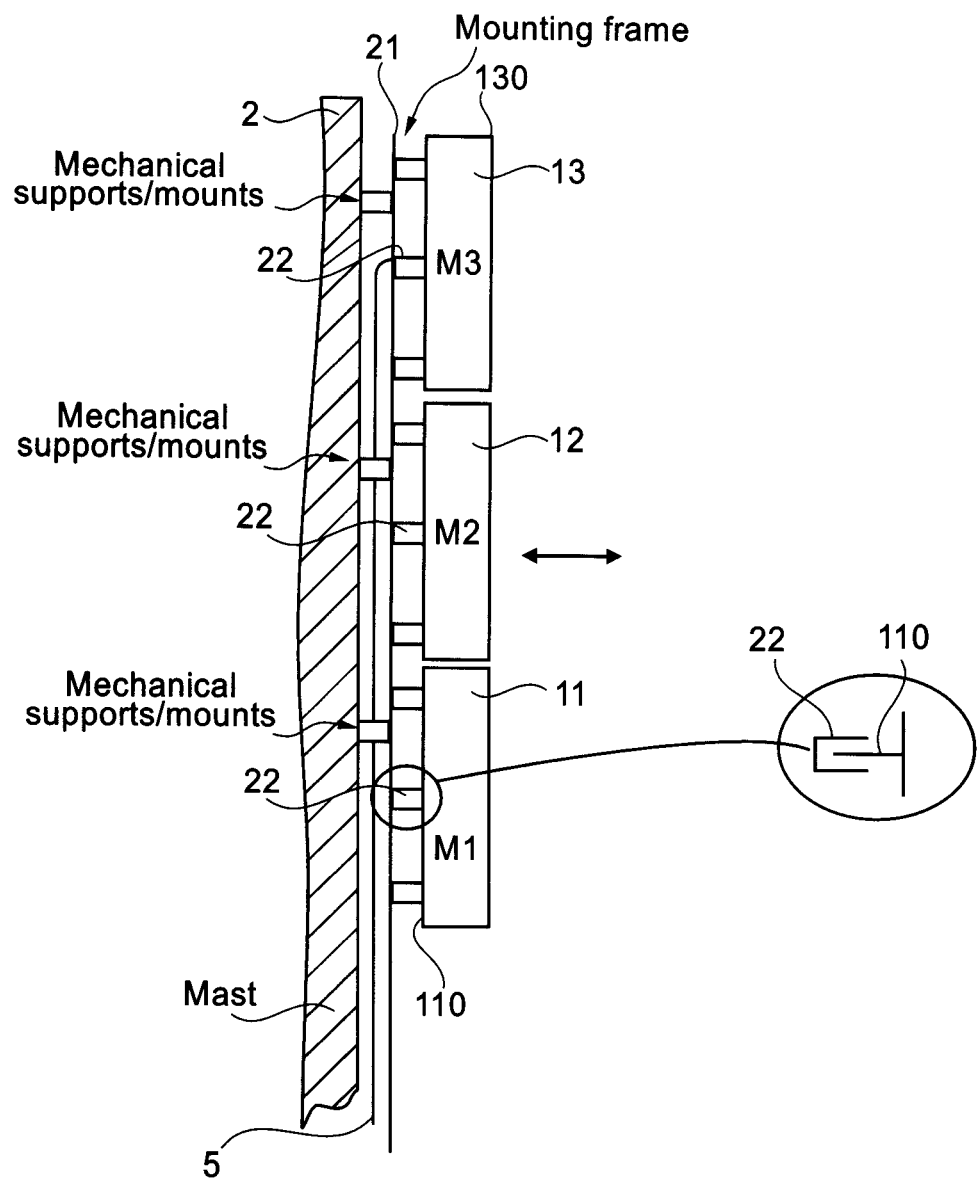
FIG. 2 shows a further aspect of the module according to the present disclosure.

FIG. 2 shows another aspect of the present disclosure with the active antenna system 1 depicted sideways. A frame 21 is attached to the mast 2. In turn the first module 11, the second module 12 and the third module 13 are attached to the frame 21. Usually more than one frame is attached to the mast 2 so as to deploy more than one active antenna system 1 for supplying different directions from one mast 2. The mounting frame 21 is attached to the mast 2 when the modular active antenna system 1 is first installed and the modules are then attached to this mounting frame 21. The mounting frame 21 may also be formed in a way to support mechanical downtilt requirements, in addition to electronic downtilt capabilities of the active antenna system 1. Suitable mounting spacers (not shown) may be used for example to offset the mounting frame 21 from the mast 2 and to provide any required fixed tilt. The fibre optic cable 4 is not shown in FIG. 2 for simplicity.

The mechanical mounting of the active antenna system 1 is arranged in a way that each of the first module 11, the second module 12 or the third module 13 can be mounted and de-mounted without the need to de-mount any one of the other two modules. Depending on the chosen support the first module 11, the second module 12 or the third module 13 may, for example, be slid in and out or pivoted in and out of the frame 21. In the present disclosure each of the first module 11, the second module 12 or the third module 13 has mounting means only on the back side 113 of their respective module housing, so that the first module 11, the second module 12 or the third module 13 are attached only to the frame 21 but not to each other. Once mounting means like screws have been de-mounted on the backside of the housing of a module 11, the module 11 can be moved, horizontally outwards from the frame. Thus for example, the upper-most module 13 does not need to be removed as a part of the process in replacing the centre module 12.

On the frame 21 are located in predetermined positions power plugs 22 which correspond to power plugs 110 that extend from or into the backside 113 of the housing of first module 11, the second module 12 or the third module 13. In the event that the module 11 is mounted to the frame 21 the power plug 22 of the module 11 and the power plug 22 mounted to the frame 21 engage and can then be sealed to be weatherproof. As all of the power plugs 22 that are attached to the frame 21 are connected with the power supply cable 5, each one of the first mounted module 11, the mounted second module 12 or the mounted third module 13 is supplied with power independently of the other modules.

The fibre optic cable 4 is connected to at least one of the first module 11, the second module 12 or the third module 13. The connection of the fibre optic cable 4 is carried out by, for example, an SFP (small form factor pluggable) module as is known in the art. The purpose of the SFP module (not shown in the Figs) is to convert the light signals passing through the fibre optic cable 4 from light into data signals in the module 11, 12 or 13. The SFP module therefore comprises a least a photodiode and suitable electronics. It will be noted that the SFP module only converts the light signals to electronic signals. The SFP module does not process either the light signals or the electronic signals. In most cases, the SFP module will be bi-directional, that is to say that the SFP module is capable of transmitting light signals back to the base transceiver station as well as receiving light signals from the base transceiver station. In this aspect, the SFP module will also contain a laser source, typically a laser-emitting diode, and suitable electronics to drive this laser-emitting diode with digital data signals.

It would be possible to connect the fibre optic cable 4 to all of the first module 11, the second module 12 or the third module 13, but this is generally not required in practice. It would be possible to equip all of the first module 11, the second module 12 or the third module 13 with an SFP module and only use one of the SFP modules, for example in the bottommost module—in the aspect shown in FIG. 2 this would be the third module 13. It would also be possible to equip one or more of the first module 11, the second module 12 or the third module 13 with more than one SFP module. For example a first one of the SFP modules would be used for signals operating using a GSM protocol and a second one of the SFP modules would be used for signals operating using a UMTS protocol. This would require either multiplexing of the light signals along the fibre optic cable 4 or the provision of two separate fibre optic cables 4.

Figure 3:
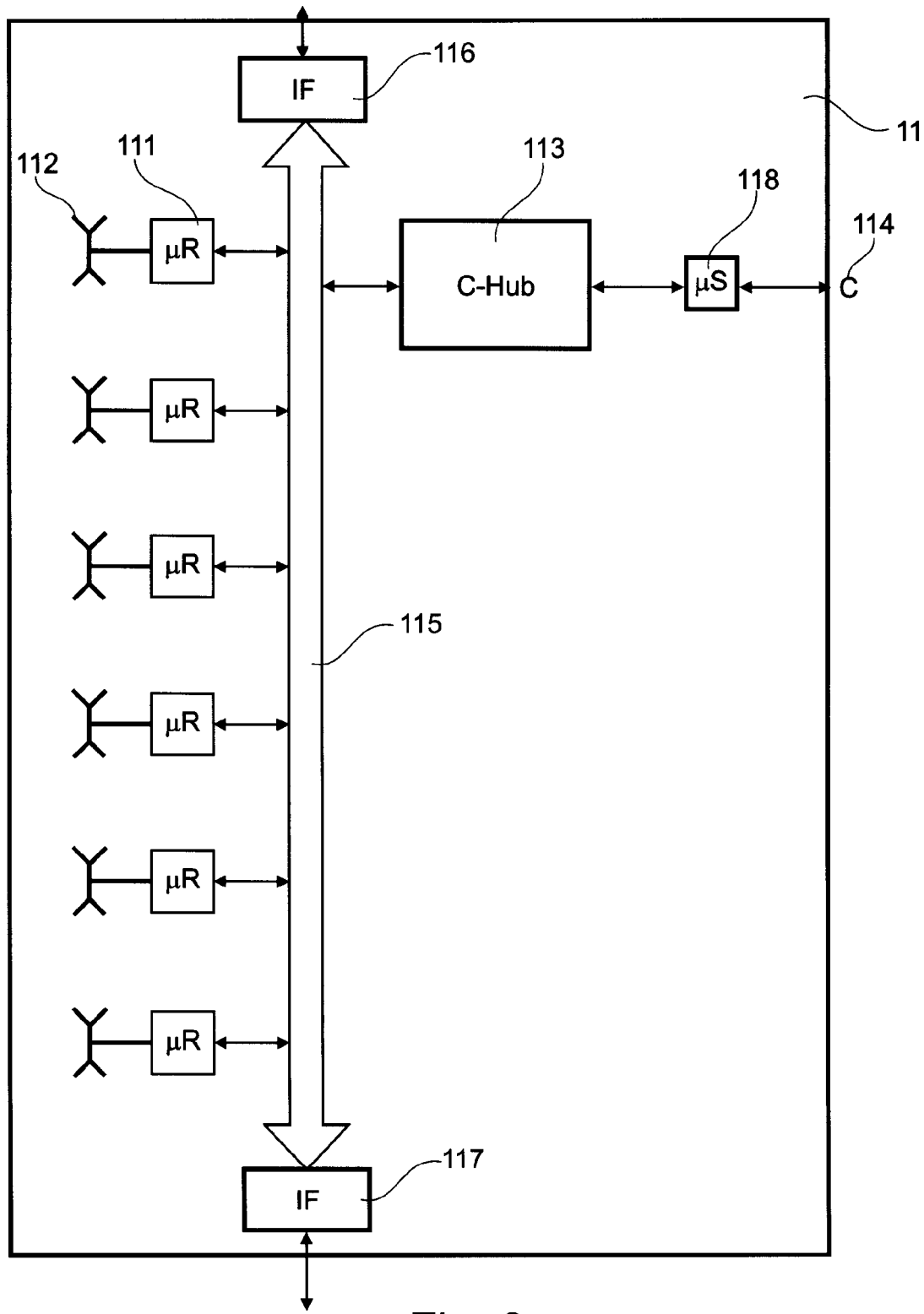
FIG. 3 shows yet another aspect of the module according to the present disclosure.

FIG. 3 shows the electrical structure of one of the first module 11, the second module 12 or the third module 13. For simplicity, the first module 11 will be chosen to illustrate the electrical structure. Each module 11 comprises a plurality of micro radio units 111. Each one of the micro radio units 111 is connected at least to one antenna element 112. In the present disclosure each one of the micro radio units 111 is connected to exactly one antenna element 112, but the person skilled in the art will appreciate that the micro radio unit 111 may be connected, for example by means of a hybrid coupler to two or more of the antenna elements 112. The micro radio units 111 are transceivers that transmit the radio signal to be sent in the downlink and receive radio signals in the uplink. In the present disclosure each one of the micro radio units 111 comprises a bidirectional serial interface connected to an internal bus 115.

The bidirectional link between the micro radio units 111 and a so called C-hub 113 is based on the well known standard termed "SerDes". The SerDes functionality basically comprises parallel-to-serial as well as serial-to-parallel conversion, channel coding and decoding plus clock recovery and synchronization. A signal received in the micro radio unit 111 is converted from its analogue form into digital samples that are transmitted to the C-hub 113 via an internal bus 115. Similarly the bidirectional interface of each one of the micro radio units 111 extracts from the internal bus 115 the data that is destined for that specific micro radio unit 111 and converts the data samples into an analogue radio signal to be transmitted over the attached antenna element 112.

The C-hub 113 converts a CPRI/OBSAI downlink signal received at the CPRI/OBSAI terminal 114 and supplies the converted signals in an appropriate time frame and distributes them in the "SerDes" Format via the internal bus 115 to the micro radio units 111. Similarly received uplink signals from the micro radio units 111 are arranged in an uplink data stream that is sent by the C-Hub 113 via the CPRI/OBSAI terminal 114 to the remote base transceiver station.

Optionally a so-called micro sniffer 118 can be inserted between the C-Hub 113 and the CPRI-terminal 114. The micro sniffer 118 is a special micro radio unit with inverse receive and transceiver band for monitoring and calibrating purposes. The micro sniffer 118 transmits pilot signals towards and detects the radiation emitted from the antenna elements 112, thus providing the C-hub 113 with feedback control operation as required by the micro radio units 111 for calibration purposes. More detailed information on the interaction of micro radio units 111, serial interface 115 and C-hub 113 can be found in U.S. patent application Ser. No. 12/339, 239 wherein this concept was presented.

In this aspect of the present disclosure two inter-module interfaces 116, 117 are connected to the internal bus 115. By means of the two inter-module interfaces 116, 117 the internal bus 115 can be extended to an internal bus of at least the second module 12 that is placed in the vicinity of the first module 11.

The C-hub 113 may or may not be present in all of the first module 11, the second module 12 or the third module 13. In practice only one C-hub 113 in one module is required to control the collection and distribution of the data signals along the internal bus and to the other ones of the modules. It is possible for manufacturing simplicity to provide all of the first module 11, the second module 12 or the third module 13 with the C-hub 113 and then switch off non-required ones of the C-hub 113 in other modules. It is also possible to operate all of the C-hubs 113 in all of the first module 11, the second module 12 or the third module 13. The provision of the C-hub 113 in each of the modules enables each one of the C-hubs 113 to made using a small FPGA as each one of the C-hub 113 would effectively take over ⅓ of the performance of a central or master C-hub in a single one of the modules 11, 12, 13.

Figure 4:
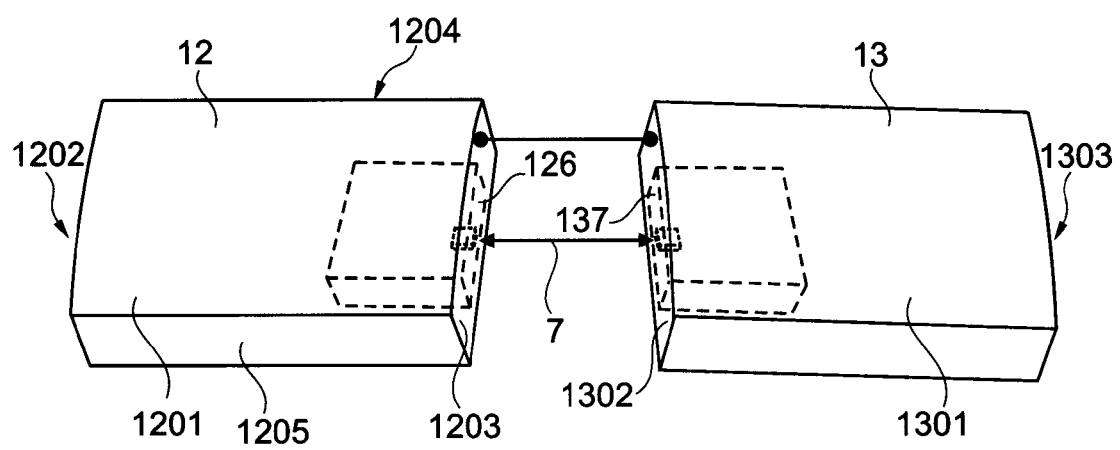
FIG. 4 shows yet another aspect of the module according to the present disclosure.

FIG. 4 shows another aspect of the present disclosure, where the second module 12 and the third module 13 are placed adjacent to each other. In the three dimensional FIG. 4 the part of the housing that forms the longest side of the housing is located on the front side 1201, 1301 of the second module 12 and third module 13 respectively. In order to demonstrate that the arrangement of the second module 12 and the third module 13 can be chosen in any appropriate alignment, the second module 12 and the third module 13 are placed horizontally adjacent to each other, so that the second module 12 is on the left side of the third module 13. A person skilled in the art will also appreciate that the modules 11, 12 and 13 may be arranged more generally as a matrix, for example as two modules horizontally and three modules vertically, resulting in an active antenna array 1 composed of six modules.

In FIG. 4 the second module 12 comprises, on a right side of its housing 1203, a third interface 126 and the third module 13 comprises on a left side of its housing 1302 a fourth interface 137. Electrically the third interface 126 and the fourth interface 137 are identical to the first interface 116 and the second interface 117 of the first module 11 shown in FIG. 3. The third interface 126 and the fourth interface 137 are designed for near field communication purposes and are directed such that only adjacent ones of the third interface 126 and the fourth interface 137 communicate with each other. The second module 12 and the third module 13 may comprise further interfaces to communicate with further modules either placed to the right of the second module 12, to the left of the third module 13 or on top of the second module 12 or the third module 13, or below the second module 12 or third module 13. For the purpose of providing the interfacing capability for a matrix of modules, each one of the modules may provide an interface on its top side of the housing 1204, the bottom side of its housing 1205, the left side of its housing 1202 and the right side of its housing 1203.

In FIG. 4 the third interface 126 and the fourth interface 137 are chosen to be optical interfaces establishing a bi-directional optical link 7 between the second module 12 and the third module 13. The optical link 7 may be in the infrared range of light. Due to the optical link 7 at least part of the housing, or all of the end-panels on the left and right side of the housing have to be transparent in order to allow the optical link to pass from one module to an adjacent module, whilst still permitting the modules themselves to be factory sealed and thereby reliable from an environmental ruggedness perspective. The internal bus of the second module 12 is extended via this optical link 7 to the internal bus of the third module 13.

The extension of the internal bus means that only one of the C-hubs 113, either in the second module 12 or the third module 13, is needed to distribute and collect data between all the micro radio units 111 in the second module 12 and the third module 13 and the remote base transceiver station 3. In the aspect shown in FIG. 4, for example, the second module 12 comprises a C-hub 113. The third module 13 may be delivered in a second version of the module without a C-hub 113, or be supplied with a second C-hub 113. This second C-hub 113 is not necessary for the function of the active antenna system 1. The person skilled in the art may decide, as noted above, to implement a C-hub 113 in each one of the modules, as this may simplify the C-hub 113 and/or reduce the number of different modules to be produced and to be held in storage as spare parts. In the case that all of the modules are identical and all of the modules provide a C-hub 113, in case of failure of a C-hub 113, the defective C-hub may be deactivated remotely and one the other C-hubs can take over the task of the defective C-hub 113.

The choice of which one of the C-hubs 113 in which one of the modules 11, 12 or 13 is activated can be decided on a number of factors. In practice any one of the C-hubs 113 will be able to address any one of the micro radio units 111. The choice of the master or central C-hub 113 can either be pre-programmed or decided by a process of auto-negotiation.

The person skilled in the art will also consider, in a specific application, if it is more efficient to exchange other control information like status control, status messages, warnings and alarms over one interface by multiplexing the information with the data of the internal bus 115, or to provide at least a second link in parallel by a control interface purely for the exchange of the other information.

Figure 5A:
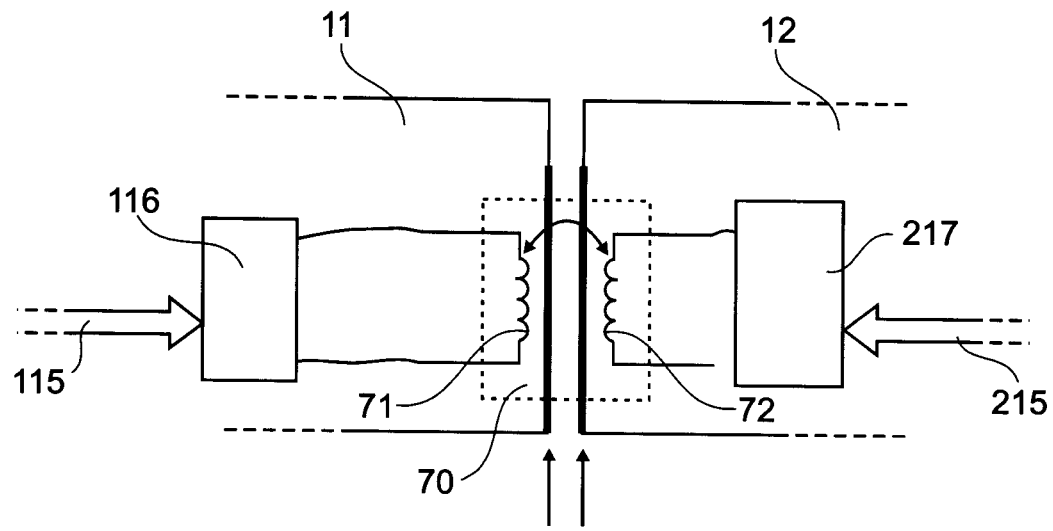
FIGS. 5a, 5b and 5c show another aspect of the module according to the present disclosure.
Figure 5B:
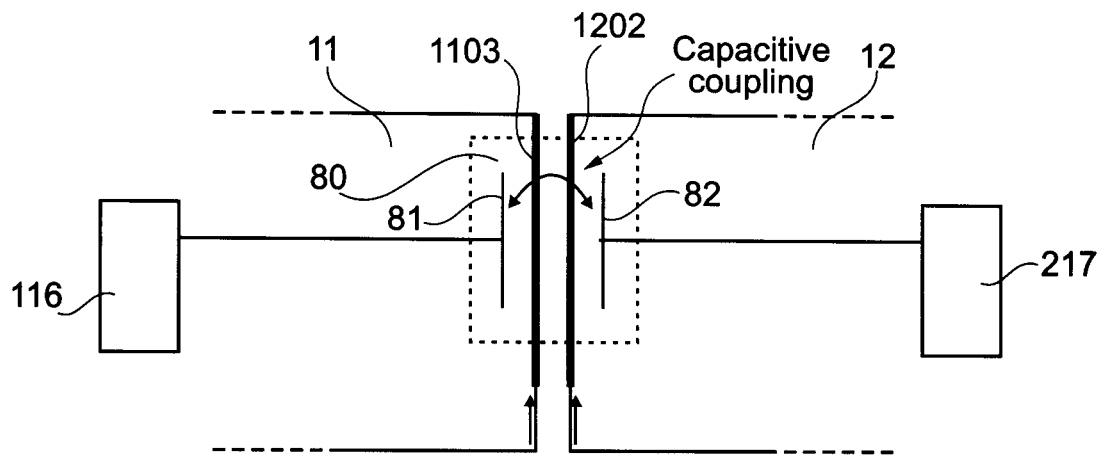
Figure 5C:
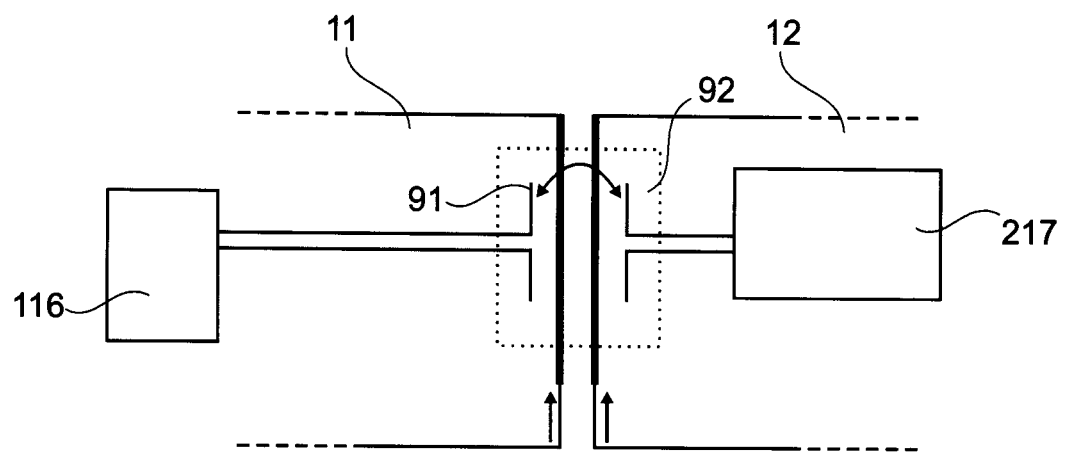

FIGS. 5a, 5b and 5c show other aspects of the present disclosure in which the inter-module interfaces use electromagnetic transmission from a first inter-module interface in a first module 11 to a second inter-module interface in a second module 12. In this aspect of the present disclosure the signals are coupled electromagnetically. In this aspect the housing material of the housing needs to be electromagnetically transparent, but may be optically non-transparent. This means that virtually any form of plastic could be used given the extremely short transmission distance between the two modules that are mounted adjacent to each other. The selection of the housing material is therefore simplified and could be selected primarily for mechanical strength, cost and environmental longevity without needing to worry too much about its electromagnetic properties.

As one aspect of electromagnetic transmission, FIG. 5a shows the use of inductive coupling between a first interface 116 in the first module 11 and a second interface 217 located in the second module 12. This inductive coupling can take many forms. FIG. 5a shows one non-limiting example of inductive coupling. A first coil 71 is connected to the first interface 116 and a second coil 72 is connected to the second interface 217. When the first interface 116 and the second interface 127 are placed adjacent to each other both of the first coil 71 and the second coil 72 commonly form a transformer 70 with a primary winding and a secondary winding. If the first interface 116 is transmitting the first coil 71 of the first interface 116 forms a primary winding and the second coil 72 of the second interface that is receiving forms a secondary winding. If the second interface 217 is transmitting the roles change and the second coil 72 is the primary winding and the first coil 71 is the secondary winding of that transformer 70. The signals flowing in the primary windings induce corresponding signals in the secondary winding. The induced signals can then be processed, e.g. by amplifying and discriminating the amplified signal. As signals on the first internal bus 115 are transmitted by the first interface and second interface to the second internal bus 215 and vice versa, the first internal bus 115 and the second internal bus 215 behave like a single bus and transmit the information to and from each micro radio unit 111 to one or more of the C-hubs 113, as noted above.

It will be appreciated that it may be opportune to provide two separate inductive couplings between two of the modules 11, 12 and 13, for example on opposite sides of the antenna housing. This will enable one of the two separate inductive couplings to transfer the signals in one direction and other one of the two separate inductive couplings to transfer the signals in another direction. Each one of the separate inductive couplings would thus form a unidirectional link.

As another aspect of the electromagnetic interfaces, FIG. 5b shows a capacitive coupling arrangement, in which the end panels 1103, 1202 of the modules 11, 12 together form a dielectric between a first plate 81 and a second plate 82 of a capacitor 80. The first plate 81 of the capacitor 80 is within the first module 11 and is electrically connected to the first inter-module interface 116. The second plate 82 of the capacitor 80 is within the second module 12 and is electrically connected to the second inter-module interface 217. The first plate 81 and the second plate 82 might be formed by a foil of metal attached on the insides of the modules housings to the end panels 1103, 1202. This arrangement functions like any other capacitor, passing alternating current signals through a dielectric. In this case the material of the end panels, due to dielectric losses, influence the signal strength that is received at the other end of the capacitor.

It will also be appreciated that two separate capacitive coupling arrangements may be provided between two of the modules 11, 12 and 13 which enable each one of the two separate capacitive couplings to transfer the signals in different directions. Each one of the two separate capacitive couplings is therefore a unidirectional link.

As another aspect of the electromagnetic interfaces FIG. 5c shows the use of radiation. The first inter-module interface 116 in the first module 11 is connected with a first antenna 91 and the second inter-module interface 217 in the second module 12 is connected to a second antenna 92. The first antenna 91 and the second antenna 92 are each placed in the inside of the housing of the first module 11 and the second module 12 and are operated in their near-field. Similarly there may be two different antennas in each one of the modules for transmitting radiation in only one direction (thus forming the unidirectional link). One of the two different antennas transmits the radiation in one direction and another one of the two different antennas transmits the radiation in another direction.

In this aspect of the present disclosure three modules form an active antenna system 1, each one of the three modules comprising six antenna elements. This arrangement comprises eighteen antenna elements in total. The non-modular active antenna systems in one housing known at the time of the disclosure have sixteen antenna elements. The modularized active antenna system 1 of this disclosure has therefore two antenna elements in excess of the usual number of antenna elements. The person skilled in the art may decide to offer two types of modules with a different number of antenna elements, for example to provide an active antenna system of two modules with six antenna elements and one module that only provides four antenna elements. If the modules with the six antenna elements are used as the top and the bottom module, one could also chose not to implement the second communications interface for the top module and the bottom module, as only a module in the middle needs two communication interfaces to extend the internal bus to both sides, i.e. to the top and the bottom, or to the left and to the right. Although by economising two antenna elements and two micro radio units 111, and maybe even one communications interface, in the end the production and delivery of two different type of the modules may be more costly than providing only one single type of module. The person skilled in the art may even prefer three identical modules, as this provides two spare micro radio interfaces and two spare antenna elements which could be used as redundancy in the event that one of the other sixteen micro radio units/antenna elements fails.

The present disclosure further relates to a computer program product embedded on a computer readable medium. The computer program product comprises executable instructions for the manufacture of the module of the present disclosure.

While various embodiments of the present invention have been described above, it should be understood that they have been presented by way of example, and not limitation. It will be apparent to persons skilled in the relevant arts that various changes in form and detail can be made therein without departing from the scope of the invention. Thus, the present invention should not be limited by any of the above-described exemplary embodiments, but should be defined only in accordance with the following claims and their equivalents.

The invention claimed is:

1. A module for an active antenna system for receiving and transmitting radio signals, comprising:
a housing;
at least one radio unit for transceiving digital radio signals;
at least one antenna element located within the housing connected to the at least one radio unit;
an internal data bus for the distribution and collection of the digital radio signals within the module; and
at least one contactless communication interface for data distribution and collection with an adjacent module,
wherein the at least one contactless communication interface is one of inductive couplers, capacitive couplers, or optical couplers.

2. The module according to claim 1, wherein at least part of the housing is electromagnetically transparent.

3. The module according to claim 1, wherein at least part of the housing is optical transparent.

4. The module according to claim 1, further comprising a hub for controlling the distribution and collection of the digital radio signals within the module.

5. The module according to claim 4, further comprising a control device for switching the hub into at least one of an activated state, in which the hub communicates with the at least one radio unit, or a deactivated state, in which the hub does not communicate with the at least one radio unit.

6. The module according to claim 1, further comprising at least one feedback sampling circuit.

7. The module according to claim 1, further comprising mounting parts for mounting the module to an external frame.

8. The module according to claim 7, wherein the mounting parts are arranged such that the module can be placed to and displaced from the external frame without being blocked by other modules.

9. The module according to claim 8, wherein the mounting parts are formed such that when the module is placed to the frame the module power connector is engaged with a counterpart supply voltage connector of the frame.

10. The module according to claim 1, further comprising a module power connector connectable with an external power supply external to the housing for supplying the module with supply power.

11. The module according to claim 1 wherein the at least one radio unit, the internal bus, and the at least one contactless communication interface are integrated on a single circuit board.

12. The module according to claim 1, wherein the at least one radio unit further comprises a digital signal converter.

13. A module for an active antenna system for transceiving radio signals, comprising:
a housing, the housing comprising a housing back, at least a first end panel of the housing and at least a second end panel opposite to the first end panel;
at least one radio unit for transceiving digital radio signals having a digital signal-converter;
at least one antenna element located in the housing connected to the at least one micro radio;
an internal data bus for the exchange of digital radio signals with the at least one radio unit and a hub;
at least a first communication interface being connected to the internal bus and placed at the first end panel for exchanging digital data in case another module is placed next to the first end panel;
at least a second communication interface being connected to the internal bus and placed at the second end panel for exchanging data in case another module is placed next to the second end panel.

14. A method for manufacturing a module comprising the steps of
connecting at least one radio unit for transceiving digital radio signals having a digital signal-converter; whereby the at least one radio unit converts the digital radio signals to analogue RF (radio frequency) signals and vice versa, to an internal data bus;

connecting at least one antenna element to the at least one radio unit;

connecting at least one contactless communication interface for data distribution and collection to an adjacent module to the internal bus, wherein the at least one contactless communication interface is one of inductive couplers, capacitive couplers, or optical couplers.

15. An active antenna system for receiving and transmitting radio signals comprising at least a first module and a second module, each one of the first module and the second module sealed in a housing; each one of the first module and the second module comprising:

at least one radio unit for transceiving digital radio signals having a digital signal converter;

at least one antenna element located within the housing connected to the at least one radio unit;

an internal data bus for collection and distribution of digital radio signals with the at least one radio unit;

at least one contactless communication interface for data exchange to an adjacent module, wherein the at least one contactless communication interface is one of inductive couplers, capacitive couplers, or optical couplers.

* * * * *